(No Model.)  5 Sheets—Sheet 1.

E. WESTON.
ELECTRICAL MEASURING INSTRUMENT.

No. 446,493. Patented Feb. 17, 1891.

WITNESSES:
Gustave Dieterich
William Goebel

INVENTOR
Edward Weston
BY
Park Benjamin
his ATTORNEY.

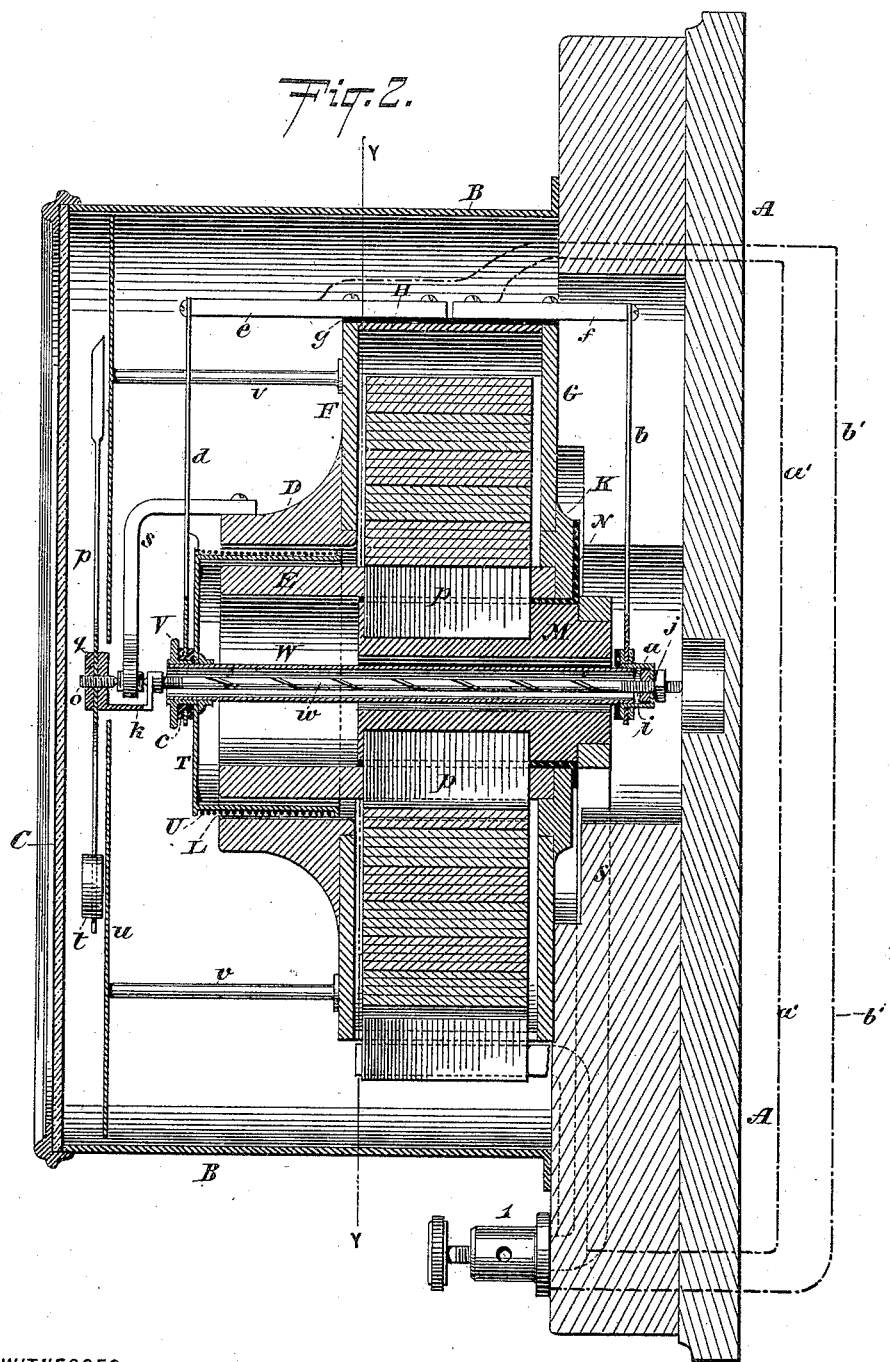

(No Model.) 5 Sheets—Sheet 3.
E. WESTON.
ELECTRICAL MEASURING INSTRUMENT.
No. 446,493. Patented Feb. 17, 1891.
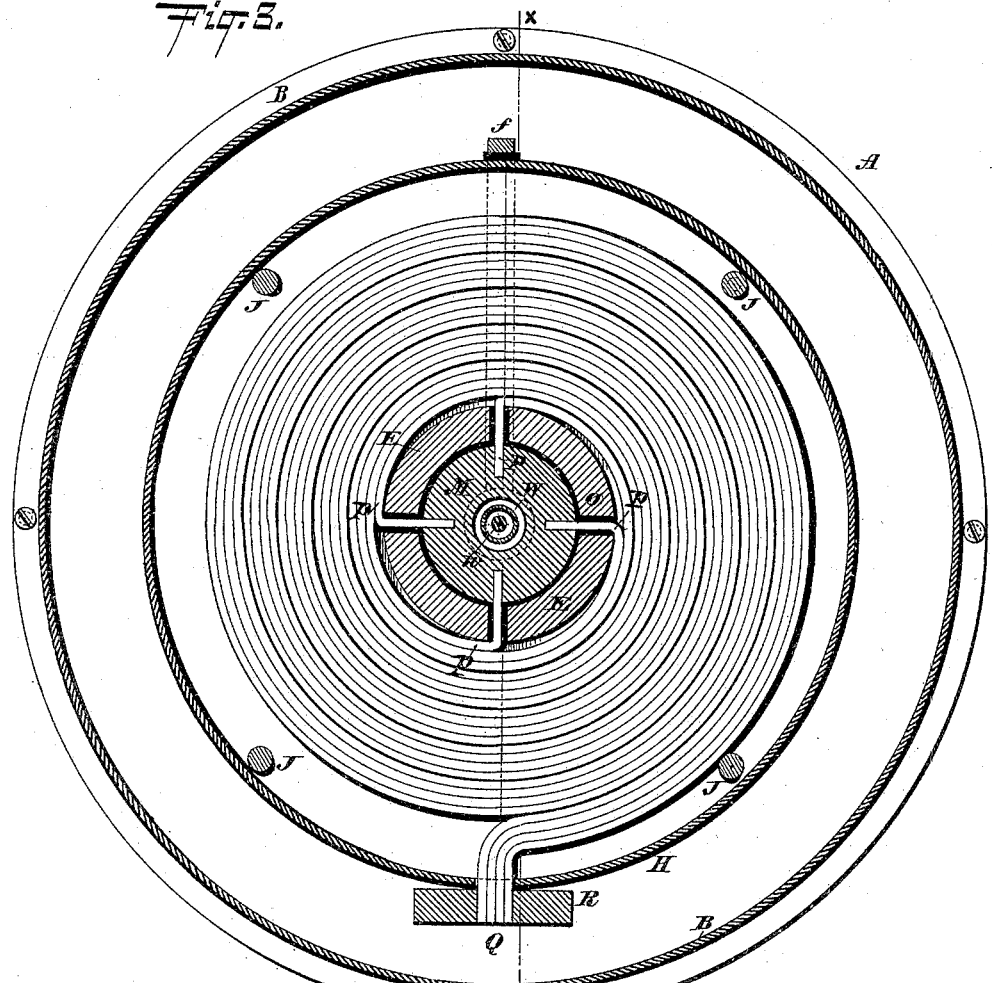
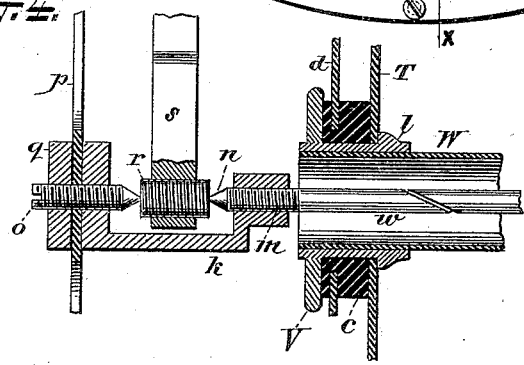
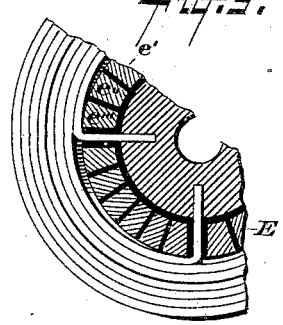
WITNESSES:
Gustave Dieterich
William Goebel
INVENTOR
Edward Weston
BY Park Benjamin
ATTORNEY.

(No Model.) 5 Sheets—Sheet 4.
E. WESTON.
ELECTRICAL MEASURING INSTRUMENT.

No. 446,493. Patented Feb. 17, 1891.

WITNESSES:
Gustaven Dieterich.
William Goebel.

INVENTOR
Edward Weston
BY
ATTORNEY.

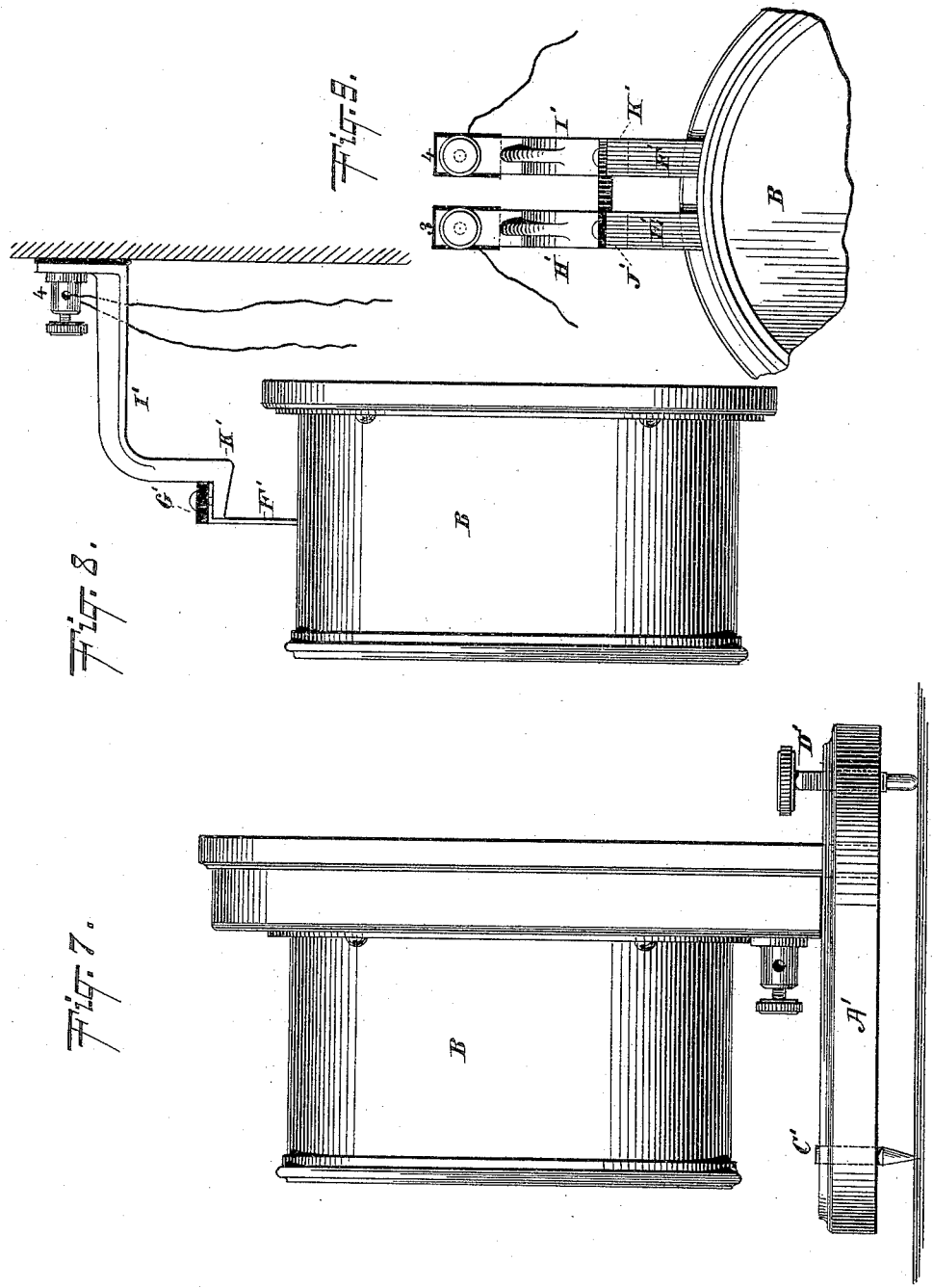

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 446,493, dated February 17, 1891.

Application filed October 14, 1890. Serial No. 368,078. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an instrument for measuring the difference of electrical potential between its terminals, and hence either current-strength or current-pressure, although it is intended more particularly for the measurement of currents of high strength.

My invention consists in the construction of the instrument as hereinafter detailed, the principal features thereof being the form and arrangement of the magnet, the disposition of the coils therein, and the device for transmitting motion from the moving coil to the index-needle, comprising a spiral spring supported so as to have no initial tension, and mechanism whereby a very slight movement of the moving coil produces a large displacement of the index. The instrument I find on practical testing to be exceedingly sensitive in operation, accurate in measurement, not influenced by induction from exterior sources, and capable of measuring currents as high as fifteen thousand ampères and over without danger of injury.

Figure 1:
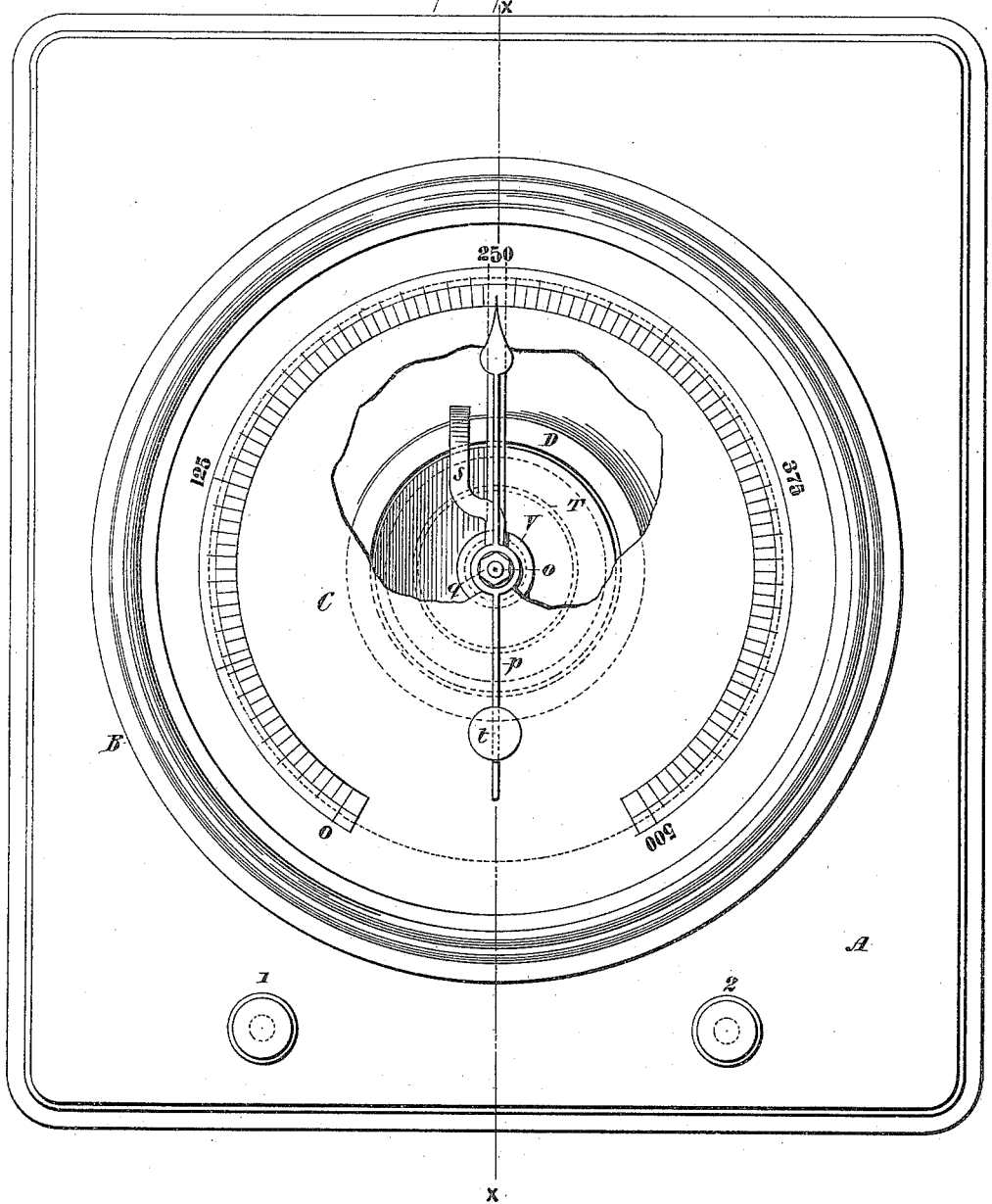
Figure 6:
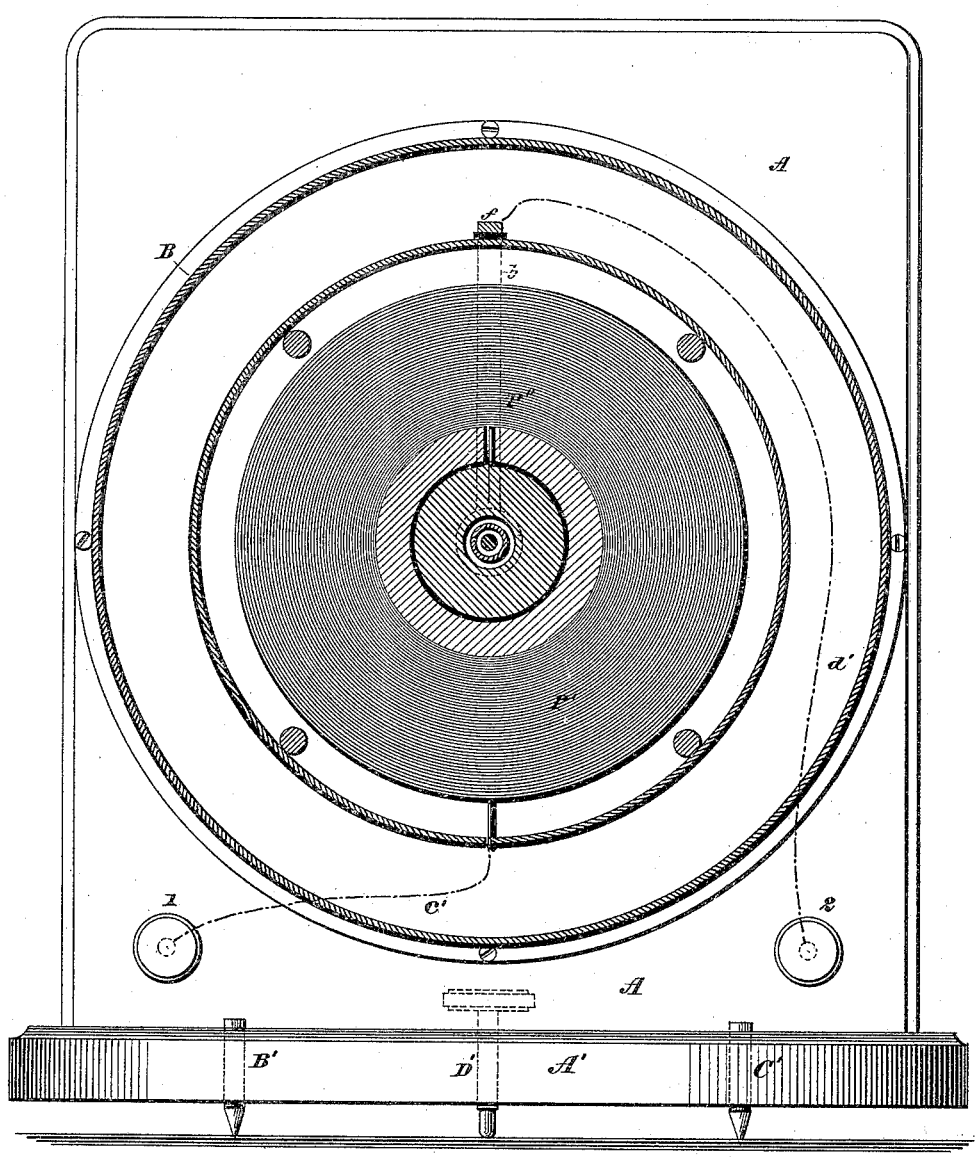

In the accompanying drawings, Figure 1 is a front view of the instrument. Fig. 2 is a vertical sectional view on the line X X of Fig. 1. Fig. 3 is a vertical sectional view on the line Y Y of Fig. 2. Fig. 4 is a longitudinal section showing details of the needle-pivot mechanism. Fig. 5 is a partial transverse section showing in detail the laminations of the magnet-pole. Fig. 6 is a vertical transverse section, also on the line Y Y of Fig. 2, showing an instrument supported on a base provided with means for leveling, and also having a coil of high resistance to adapt it for use as a potential-indicator. Fig. 7 is a side elevation of the instrument. Fig. 8 shows the instrument detached from its base and upright support and provided with a means of suspension from suitable brackets. Fig. 9 shows the suspension device in detail.

Similar letters and figures of reference indicate like parts.

Referring more particularly to Fig. 2, A is the back board of the instrument, and B a cylindrical case in which the mechanism is contained, the said case being secured in any suitable way to the support A. C is a glass plate in the front of said case, through which the dial or scale-plate of the instrument is visible.

I will first describe the magnet contained in the instrument, which is of peculiar construction, and consists, substantially, of a cylindrical box or case formed of the two annular disks F and G and the peripheral wall H, which is received between said disks F and G. The disks F and G are secured together by four bolts J, Fig. 3. One pole-piece D is fitted tightly or otherwise secured in the central opening of the disk F. The other pole-piece E is received in a socket formed in a flanged collar K, which is received in the central opening of the disk G. The pole-piece E therefore extends through the cylindrical box or case F G H and is received in the space surrounded by the pole-piece D, so that an annular space L is left between said pole-pieces D and E, in which annular space there necessarily exists a very strong magnetic field. It will be observed that the magnet thus forms a complete magnetic shell, which shields the working parts of the instrument from external inductive influences, so that in fact the apparatus may be used in close proximity to the field-magnets of a dynamo without any interference in the accuracy of its indications taking place.

Inserted within the pole-piece E is a copper core M, perforated longitudinally and surrounded by a sheath of insulating material N, by which said core is insulated from the magnet structure. Through the sides of the cylindrical pole-piece E are made openings, (shown in Fig. 3,) which openings are also lined with insulating material O. Through these openings and into the mass of the copper core M extend the ends of the copper strips P. Electrical connection between the ends of said strips and the body of the core M is thus made. The copper strips are wound parallel to one another around the core M and nearly fill the interior of the cylindrical magnet, forming a fixed coil, as shown. Their outer ends united are secured, as shown at Q, Fig.

3, to a metal bar R, which communicates, as indicated by dotted lines, Fig. 2, with the binding-post 1. The copper core M receives at its end another metal (copper) bar S, which communicates in any suitable way with the binding-post 2. The current therefore entering either binding-post 1 or 2 will proceed through the copper coils P and thence to the other binding-post.

T is a light shell or cylinder, of copper or other suitable metal, closed at one end and having its circular portion entering the annular space between the pole-pieces D and E. Wound upon this cylinder or shell is a coil U of fine wire. The cylinder T is of copper, or preferably aluminium, and is supported upon a flanged head V, which in turn is supported upon the extremity of a metal (copper or aluminium) tube W. The metal tube W extends through the copper core M, and at its opposite end has a cap $a$. Secured to the cap $a$ is a vertical leaf-spring $b$. Secured to the head V on the opposite end of the tube W, but insulated from said head by a band $c$, of insulating material, is a spring $d$, similar to spring $b$. The springs $b$ and $d$ are secured to bars $e$ and $f$, which are attached by screws, as shown, to the upper side of the magnet-case. Said bars are insulated from the magnet by a layer of insulating material $g$. Extending through the tube W is a spiral spring $w$. One end of this spring is provided with a threaded rod $i$, which receives a nut $j$ outside the cap $a$. The other end of the spring is attached to a yoke $k$.

The details of the last-mentioned construction, as well as of the head V, are shown on a large scale in Fig. 4. From this figure it will be seen that the spring $d$ is received in a groove in the band $c$ of insulating material, and that the face of the cylinder T is received between said band $c$ and a flange $l$ on the head $h$. It will also be seen that the outer end of the spring $w$ is connected to a threaded rod $m$, at the end of which rod, after it passes through one arm of the stirrup or yoke $k$, is formed a pivot-point $n$. Extending through the opposite arm of the yoke $k$ is a threaded pin $o$. The needle $p$ of the instrument is secured between said arm and a washer $q$ by said pin $o$. The inner end of the pin $o$ is also pointed to form a pivot similar to pivot $n$. Between the pivot-pins $n$ and $o$ is a stationary cylindrical block $r$, which is also threaded, and which is received in the end of the fixed arm $s$, which is secured to the magnet-pole D.

The needle $p$ is counterweighted at $t$, and its extremity moves over a scale-plate $u$, which is supported by standards $v$, attached to the outer face of the magnet-disk F.

The mechanical operation of the parts last described is as follows: When the tube W is moved inward or to the right of the drawing, the spiral spring $w$ therein is subjected to tension, and consequently rotates, carrying with it in its rotation the stirrup or yoke $k$, which turns on its pivot-points $n$ $o$ upon the fixed block $r$. The yoke $k$ in turning then carries with it the needle $p$ and causes said needle to move over the scale. The motion of the tube W is resisted by its suspending springs $d$ and $b$, which tend to bring said tube by their elasticity back to its original position of rest. A very slight longitudinal motion of the tube W, and consequent slight extension of the spring $w$, is quite sufficient to cause a large motion of the needle in arc.

The main circuit from the binding-post 1 through the coils of the instrument to the binding-post 2 has already been described. When the instrument is designed for use as an ammeter, a shunt-circuit proceeds as follows: from the binding-post 1 by the wire $a'$ to the bar $f$, to the spring $b$, to the tube W, and thence through the metal cylinder T to one terminal of the insulated coil U on said cylinder, thence through said coil to the spring $d$, to the bar $e$, and so by wire $b'$ to the binding-post 2.

The operation of the instrument is as follows: When the current to be measured circulates through the coil P, an intense magnetic field will be produced in the annular space between the pole-pieces D and E of the magnet. At the same time the current passing through the coil U will produce a field around said coil. In accordance with well-known laws the mutual interaction of these two fields will result in a drawing of the suspended coil U into the annular space between said pole-pieces, and the extent of movement of this coil will bear a relation to the difference of potential in the current circulating through the coils and between the terminals of the instrument. As the coil U, and consequently its supporting-cylinder, is moved inward the spiral spring $w$ is extended and rotates, thus moving, as already explained, the needle $p$ over the scale-plate $u$, and the extent of movement of the needle $p$ will depend upon the distance which the coil U is moved. The scale-plate is laid off, as indicated in Fig. 1, to show the strength of the current actuated by the needle in ampères.

Among the advantages flowing from this construction are the following:

First. The magnet is practically a closed shell, and therefore a magnetic screen protecting the instrument from the effects of induction from other magnets. I find in practice that it may be used in close proximity to the field-magnets of powerful dynamos without any material disturbance of its indications resulting.

Second. The spring $w$ may be adjusted so as to have no initial tension, or, in other words, no pull against the action of the springs $d$ and $b$. Consequently the instrument is thus rendered much more sensitive.

Third. The arrangement of the transmitting mechanism between coil U and index-needle $p$ is such that a very small movement of the coil causes an extensive movement of the index over its scale.

Fourth. The arrangement of the hollow magnet having annular poles with the fixed coil inclosed in the body of the magnet and with a terminal of said coil extending into the inner pole and there communicating with a conductor allows of a very compact disposition of all the parts and enables the movable coil carried by the support passing through the inner pole to be brought into a very intense magnetic field.

Fifth. By threading the pivot-pins $n$ and $o$, Fig. 4, and also the pivot-block $r$, these parts may be independently adjusted to suit the purposes for which the instrument is intended. The coil P, communicating with the solid copper core M, offers a conducting-channel of large cross-sectional area and permits of very heavy currents being taken through the instrument without danger of burning or other impairment, and hence instruments of this class may be adapted to currents of almost any strength, and are especially suited for employment as station-ammeters in electric-lighting plants such as now used. The instrument particularly represented in the drawings is one designed for a maximum current of five hundred ampères.

In order to reduce or prevent magnetic lag in the instrument, the magnet-poles may be laminated and the laminations separated by strips of insulating material, as shown in the sectional views, Fig. 5, the magnet-pole E here being divided into laminations $e'$ $e''$ $e'''$, &c.

When it is desired to use the instrument as a potential-indicator or as an ammeter for very weak currents, the thick quadruple copper strips P are removed and a single coil of thin copper strip P', Fig. 6, from two to three one-thousandths of an inch in thickness, is substituted, the terminal of this coil connecting, as shown at P'', Fig. 6, with the copper core. The circuit in the instrument as thus arranged proceeds as follows: from binding-post 1, Fig. 6, by wire $c'$ to the coil P', to the copper core M, to the spring $b$, tube W, coil U, spring $d$, bar $e$, and thence to binding-post 2 by wire $b'$, Fig. 6. When the instrument is thus constructed, the high resistance of the coil P' will cause the suspended coil U to take a position between the poles of the magnets, depending primarily upon the difference of potential of the terminals of the instrument, and the scale-plate in such case will of course be graduated to indicate this difference of potential in volts.

It will of course be obvious that in instruments of this kind means must be provided to prevent any longitudinal tilting of the instrument, the effect of which might be to cause the coil-supporting cylinder T to move by its own weight into or out of the magnet, and hence to cause the spring $w$ to move the needle, thus making a false indication. In order to allow of the instrument being adjusted truly, I may provide it with a base A', Fig. 6, supported on a tripod B' C' D', one foot of which D' may be made vertically adjustable, as by means of a screw, as shown in Fig. 7, or I may suspend the entire instrument in the mode shown in Fig. 8. In this case the terminals of the instrument E' F' are brought out at one side of the cylindrical case B and are secured to a transverse bar G' of rubber or other insulating material. Upon a convenient wall are arranged two bent brackets H' I', having parallel arms J' and K', which receive the bar G', laid upon them. The faces of the terminals E' F' then make contact with the arms J' K'. Binding-posts 3 4 may be provided, so that one leading-in wire may be connected to each bracket. The arrangement of the two suspension-bars E' F', which are preferably flexible, and the supporting-bracket obviously prevents any material longitudinal tilting of the instrument.

I claim—

1. In an electrical measuring-instrument, two coils having their longitudinal axes in prolongation, one of said coils being supported in inductive proximity to and moving in the direction of its axis with reference to the other coil, a vibrating index-needle, and means for transforming the axial bodily movement of said movable coil into vibratory movement of said index.

2. In an electrical measuring-instrument, two coils having their longitudinal axes in prolongation, one of said coils being provided with an elastic or resilient support and held in inductive proximity to and moving in the direction of its axis with reference to the other coil, a vibrating index, and means for transforming the axial bodily movement of said movable coil into vibratory movement of said index.

3. In an electrical measuring-instrument, a fixed coil, a movable coil provided with a resilient or elastic support, the said coils having their longitudinal axes in prolongation, a vibrating index, and a spiral spring extending between said movable coil and said index and operating to transform the axial bodily movement of said coil into vibratory movement of said index.

4. In an electrical measuring-instrument, a fixed coil, a movable coil provided with a resilient or elastic support, the said coils having their longitudinal axes in prolongation, a vibrating index, a spiral spring extending between said movable coil and said index and operating to transform the axial bodily movement of said coil into vibratory movement of said index, and means for adjusting the initial tension of said spiral spring.

5. In an electrical measuring-instrument, a fixed coil, a longitudinally-movable spring-supported tubular core therein, a coil supported on said core and in inductive proximity to said first coil, a spiral spring connected to said core at one end thereof and extending through said core, and a vibratory index communicating with said spring, the aforesaid parts being constructed and arranged so that longitudinal movement of the movable coil communicated to said core causes an expansion or contraction of said spiral spring and a consequent vibration thereby of said index.

6. In an electrical measuring-instrument, and in combination with a moving body therein, the extent of movement of which is to be indicated, a spiral spring, a yoke or stirrup, a fixed pivot-support for said yoke, and an index, the said spring being secured at one end to one arm of said yoke and at the other end to said body, the said yoke receiving and being pivoted upon said fixed support and the said index being actuated by the other arm of said yoke.

7. In an electrical measuring-instrument, the combination of a fixed coil, a spring-supported tube within said coil, a second coil in inductive proximity to said first coil and supported by said tube, a yoke or stirrup pivoted upon a fixed support received between its arms, a spiral spring secured to one arm of said yoke extending into and secured within said tube, means for adjusting the tension of said spring, and an index carried by the other arm of said yoke.

8. In an electrical measuring-instrument, an electro-magnet having concentric annular poles, a movable support extending axially through said magnet, and a coil carried by said support and disposed in the annular space between said poles.

9. In an electrical measuring-instrument, an electro-magnet having concentric annular poles, a fixed coil in the annular space between said poles, and a conductor within the inner pole and electrically connected to a terminal of said coil.

10. In an electrical measuring-instrument, an electro-magnet having concentric annular poles, a fixed coil in the annular space between said poles, and a tubular sleeve of conducting material within the inner pole, the said sleeve being electrically connected to a terminal of said coil.

11. In an electrical measuring-instrument, an electro-magnet having concentric annular poles, a fixed coil and a movable coil having their longitudinal axes in prolongation and disposed in the annular space between said poles, a tubular sleeve of conducting material within the inner pole and electrically connected to said fixed coil, and a movable support extending axially through said sleeve and carrying said movable coil.

12. In an electrical measuring-instrument, a hollow cylindrical magnet, one pole of said magnet being annular in form, concentric with said ring, and projecting from one face thereof, and the other pole being also concentric with said ring and extending from the opposite face thereof and into said annular pole-piece.

13. In an electrical measuring-instrument, a hollow cylindrical magnet, one pole of said magnet being annular in form, concentric with said ring, and projecting from one face thereof, and the other pole-piece being also concentric with said ring and extending from the opposite face thereof axially through said ring and into said annular pole-piece, in combination with a coil disposed within the hollow magnet and inclosing the inner pole-piece.

14. In an electrical measuring-instrument, a hollow cylindrical magnet having projecting from one face annular pole-pieces, one of which extends axially through said magnet and is surrounded by the other, in combination with a coil within said hollow cylinder and surrounding the inner pole-piece, and a core within said inner pole-piece receiving a terminal of said coil.

15. In an electrical measuring-instrument, a magnet having the annular faces F G, periphery H between said faces, hollow pole-piece D, extending from face F, and pole-piece E, extending from face G and into pole-piece D.

16. In an electrical measuring-instrument, in combination with a magnet having the annular faces F G, periphery H, pole-pieces D E, the inclosed fixed coil P, and the movable coil U, received in the annular space between said pole-pieces.

17. In an electrical measuring-instrument, in combination with a magnet having the annular faces F G, periphery H, and pole-pieces D E, the inclosed fixed coil P, the core M, receiving a terminal of said coil, the tube W, passing through said core and supported by the springs $d\ b$, and the coil U, supported on said tube W and received in the annular space between said pole-pieces D E.

18. In an electrical measuring-instrument, in combination with a moving body, the yoke $k$, supported upon the pivot-block $r$ by the pivot-pins $n\ o$ passing through its arms, in combination with an index $p$, carried by one arm, and a spiral spring $w$, connected to the other arm and to said moving body.

19. In an electrical measuring-instrument, in combination with a cylindrical magnet having the faces F G, periphery H, and pole-pieces D E, the inclosed fixed coil P, the core M, receiving a terminal of said coil, the tube W, passing through said core and supported by the springs $d\ b$, the coil U, supported on said tube W and received in the annular space between said pole-pieces D E, the pivoted yoke $k$, the spiral spring $w$, connecting said yoke and said tube W, and the index $p$, carried by said yoke.

20. In combination with an electrical measuring-instrument containing a movable coil, the suspension-bars E' F', secured to the said instrument and disposed in a plane passing transversely through the longitudinal axis of said coil.

21. In combination with an electrical measuring-instrument containing a movable coil, the flexible suspension-bars E' F', disposed in a plane passing transversely through the longitudinal axis of said coil, transverse connecting-bar G', of insulating material, and the fixed brackets H' I'.

EDWARD WESTON.

Witnesses:
K. W. ELY,
H. B. GAUGH.